United States Patent [19]

Takei

[11] Patent Number: 5,505,104
[45] Date of Patent: Apr. 9, 1996

[54] DRIVE APPARATUS AND XY TABLE ON WHICH IT IS EQUIPPED

[75] Inventor: Seiji Takei, Kanagawa, Japan

[73] Assignee: Nippon Thompson Co., Ltd., Tokyo, Japan

[21] Appl. No.: 230,259

[22] Filed: Apr. 20, 1994

[30] Foreign Application Priority Data

Apr. 23, 1993 [JP] Japan .................................. 5-026820 U

[51] Int. Cl.⁶ ............................ F16H 55/18; B23B 35/00
[52] U.S. Cl. ................ 74/490.09; 74/89.15; 74/424.8 R; 74/459; 108/20; 408/91
[58] Field of Search ............................ 74/490.09, 89.15, 74/424.8 R, 459; 108/20, 137; 408/87, 91, 234

[56] References Cited

U.S. PATENT DOCUMENTS 4,148,235  4/1979  Gerth ................................. 82/21 R X
5,292,211  3/1994  Takei ................................. 408/91 X

FOREIGN PATENT DOCUMENTS 2300851  7/1974  Germany ........................... 74/424.8 R
1446394  12/1988  U.S.S.R. ............................... 74/89.15

*Primary Examiner*—Charles A. Marmor
*Assistant Examiner*—Troy Grabow
*Attorney, Agent, or Firm*—Sughrue, Mion, Zinn, Macpeak & Seas; Richard C. Turner; Marc Kaufman

[57] ABSTRACT

A drive apparatus, along with an XY drive apparatus on which it is equipped, is provided which, together with allowing highly accurate driving and positioning of a driven object by absorbing deflection in the radial direction of a nut, achieves reduced size of the apparatus and simplification of its structure.

6 Claims, 8 Drawing Sheets

5,505,104

DRIVE APPARATUS AND XY TABLE ON WHICH IT IS EQUIPPED

BACKGROUND OF THE INVENTION

1. Field of the Invention

The present invention relates to a drive apparatus for moving an object (driven object) in a desired direction, and an XY drive apparatus on which said drive apparatus is equipped.

2. Description of the Prior Art

An example of the prior art having this type of drive apparatus is the XY drive apparatus shown in FIG. 1.

As shown in FIG. 1, said XY drive apparatus is composed of X table 1; installed on the floor or a mounting frame and so forth in a workshop, and Y table 2 arranged to cross said X table 1 and move while being supported by said X table. Furthermore, since X table 1 and Y table 2 are mutually of nearly the same constitution, the following provides a detailed description of X table 1 only, while an explanation of Y table 2 is omitted. However, those constituent members of Y table 2 that correspond to the constituent members of X table 1 are indicated using the same reference numerals.

As indicated in FIGS. 1 and 2, X table 1 has a long, roughly rectangular plate-shaped base 13, and side plates 14 provided on both sides of said base 13. Mounting member 15 is attached to one end of base 13, and motor 16 and sensor connector 17 are mounted to the mounting member 15. In addition, fixed bearing mechanism 18 is provided on the other end of base 13, and feed mechanism 19 is supported by the fixed bearing mechanism 18. In addition, the torque of motor 16 is transmitted to feed mechanism 19 through coupling 20. Furthermore, as is commonly known, feed mechanism 19 is composed of screw shaft 21 and nut 22 which moves by the rotation of this screw shaft 21 by screwing onto said screw shaft 21.

As shown in FIG. 2, one end of screw shaft 21 is axially supported to as to rotate freely by bearing 18a equipped in fixed bearing mechanism 18, while the other end 21a is formed narrower than the screw portion and is axially supported so as to rotate freely by bearings 23a equipped in bearing unit 23. In addition, the gap between this other end 21a and bearings 23a in the axial direction can be eliminated by tightening lock nut 24, thus restricting the movement of screw shaft 21. This constitution is also such that the torque of motor 16 is transmitted by being coupled to coupling 20.

On the other hand, as shown in FIG. 3, nut 22 is fastened to the end of moving table 27 having a roughly T-shaped cross-section by a plurality of bolts 22a. This moving table 27 is formed to a size that is contained within the width of side plates 14, and two table projections 27a are formed in parallel on the upper end surfaces of side plates 14 on the upper surfaces of its left and right sides. The previously described Y table 2 is attached to these table projections 27a by bolts (not shown). Furthermore, as shown in FIGS. 1 and 3, cover 28 is arranged so as to be positioned to the inside of both of these table projections 27a, preventing the entrance of dust and so forth. In addition, as shown in FIG. 3, stopper 29, having a prescribed length, protrudes from one end surface of moving table 27. This stopper 29 is for restricting the movement of moving table 27 at the end position of axial movement of said moving table 27.

As shown in FIGS. 2 and 3, moving table 27 is supported by a pair of sliders 31. These sliders 31 are formed to have roughly U-shaped cross-sections, and slide along track rails 32 mounted on mounting surfaces 13a of base 13. A guiding device which guides moving table 27 in the direction (X) it is to move is composed by these sliders 31 and track rails 32. Furthermore, two grooves 13b are formed parallel to the above-mentioned mounting surfaces 13a in base 13, and sensors 34 are mounted at prescribed locations in both of the grooves 13b for detecting the stroke limit and origin position of moving table 27.

Next, the following provides an explanation of the operation of the XY drive apparatus composed in the manner described above.

To begin with, electrical power is supplied to motors 16 of X table 1 and Y table 2.

Next, when a power voltage is applied to motor 16 of X table 1, the motor 16 turns and torque is transmitted to screw shaft 21 of feed mechanism 19 through coupling 20. As a result of rotation of this screw shaft 21, moving table 27 to which nut 22 is attached moves linearly in the X direction along track rails 32. Consequently, Y table 2 mounted on said moving table 27 also moves in the X direction.

On the other hand, since Y table 2 is composed so that moving table 27 with which it is equipped (see FIG. 1) independently moves linearly in the Y direction in the same manner as the above-mentioned X table 1, by controlling the operation of said X table 1 and Y table 2 using a control circuit not shown, an electronic component and so forth on which work is to be performed on moving table 27 of Y table 2 can be moved two-dimensionally as desired.

As has been described above, in the drive apparatus of the prior art, a driven object in the form of moving table 27 is driven by a feed mechanism 19. However, the occurrence of deflection in nut 22 within the plane perpendicular to the axial center of screw shaft 21, namely the radial direction, accompanying rotation of said screw shaft 21 cannot be avoided due to curvature and center misalignment of screw shaft 21 and mounting errors and so forth in feed mechanism 19. Thus, the drive apparatus of the prior art exhibits radial deflection, pitching or yawing of electronic components and so forth on moving table 27 caused by deflection of nut 22, thereby having a detrimental effect accuracy of the location or positioning of the electronic components and so forth.

In addition, since there have recently been trends to attempt to simplify the construction of the above-mentioned drive apparatus and XY drive apparatus to reduce the size of said apparatuses as well as reduce the number of parts, a solution to these problems is needed.

SUMMARY OF THE INVENTION

Therefore, in consideration of the above-mentioned disadvantages of the prior art, the object of the present invention is to provide a drive apparatus and an XY drive apparatus on which it is equipped which, together with allowing highly accurate driving and positioning of a driven object by absorbing deflection in the radial direction of a nut, achieves reduced size of the apparatus and simplification of its structure.

The present invention provides a drive apparatus containing: a screw shaft; and, a nut which is screwed onto said screw shaft and is coupled to a driven object; wherein, an intermediate member is provided attached to said driven object which supports said nut while allowing said nut to move in a plane roughly perpendicular to the axial center of a screw shaft, and together with said intermediate member being composed of a base portion mounted on said driven object, a moving portion able to move with respect to said base portion, and flexible portions integrated into a single unit with said base portion and said moving portion which are flexible in said plane, said nut is formed into a single unit with said moving portion.

In addition, the present invention provides an XY drive apparatus having: a pair of tables arranged so as to mutually cross and allowed to move with one supporting the other, with each of said tables containing a screw shaft and a nut which screws onto said screw shaft and is coupled to a driven object; wherein, an intermediate member is provided attached to said driven object which supports said nut while allowing said nut to move in a plane roughly perpendicular to the axial center of a screw shaft, and together with said intermediate member being composed of a base portion mounted on said driven object, a moving portion able to move with respect to said base portion, and flexible portions integrated into a single unit with said base portion and said moving portion which are flexible in said plane, said nut is formed into a single unit with said moving portion.

DESCRIPTION OF THE PREFERRED EMBODIMENTS

Figure 1:
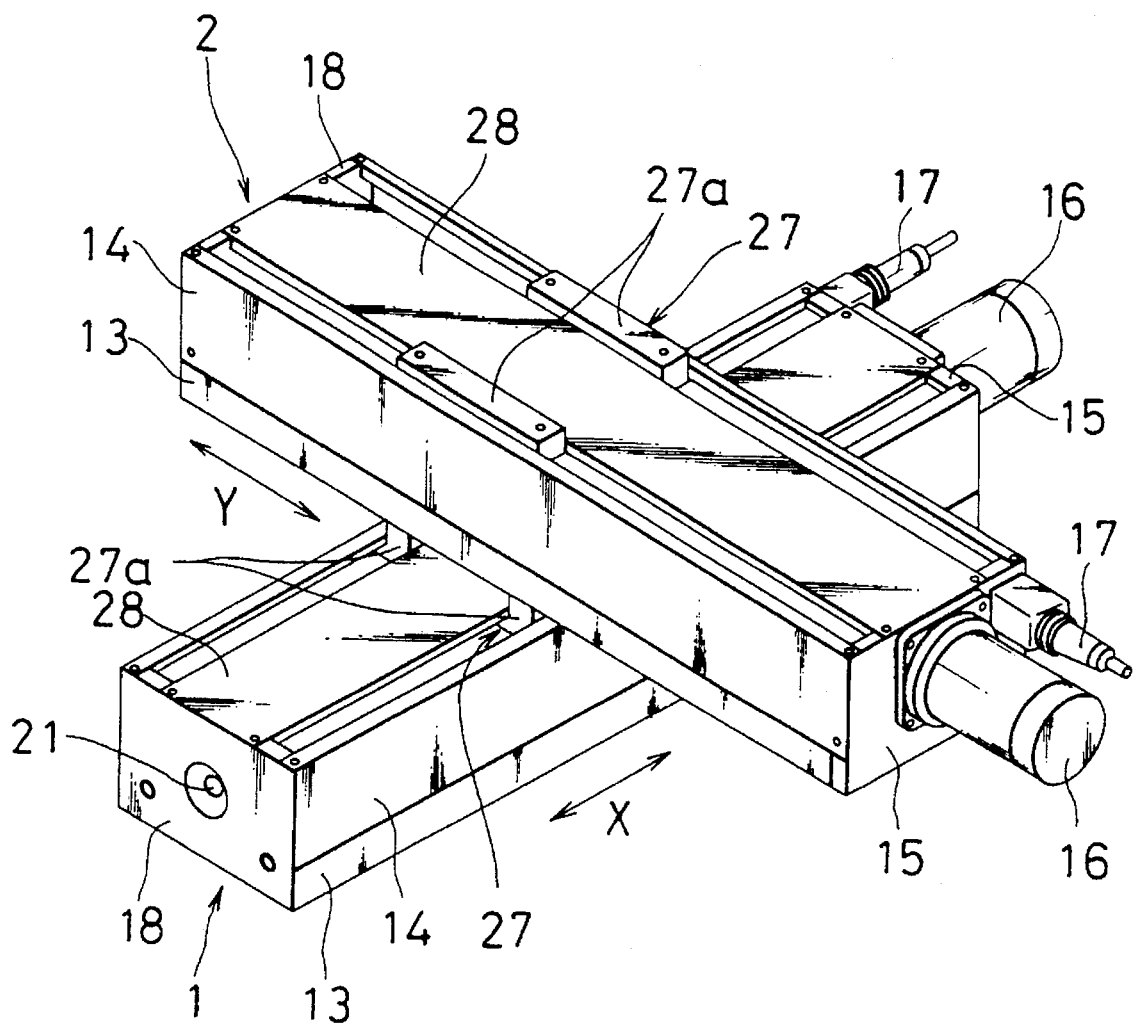
FIG. 1 is a perspective view of an XY drive apparatus of the prior art.
Figure 2:
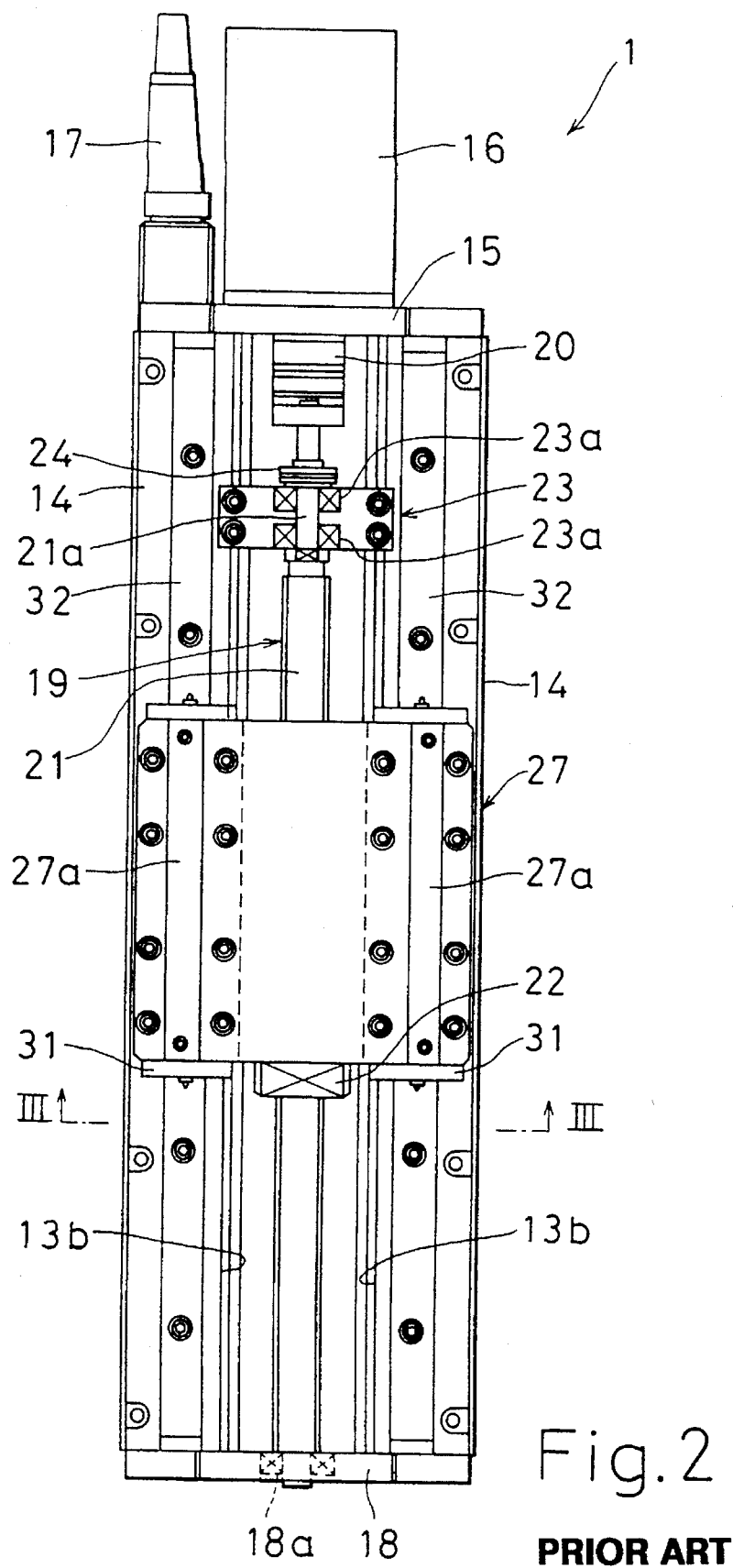
FIG. 2 is an overhead view of the internal mechanism of an X table equipped on the XY drive apparatus shown in FIG. 1.

Next, the following provides an explanation of an XY drive apparatus as a first embodiment of the present invention with reference to FIGS. 4 through 7. Furthermore, since this XY drive apparatus is composed in the same manner as the XY drive apparatus of the prior art shown in FIGS. 1 through 3 with the exception of the essential portion to be explained below, an explanation of the overall apparatus is omitted, with the explanation only focusing on the essential portion. In addition, in the following explanation, those constituent members either identical or corresponding to the constituent members of the XY drive apparatus of the prior art are indicated with the same reference numerals. In addition, these provisions apply similarly with respect to the explanation of the second embodiment to be described later.

Figure 4:
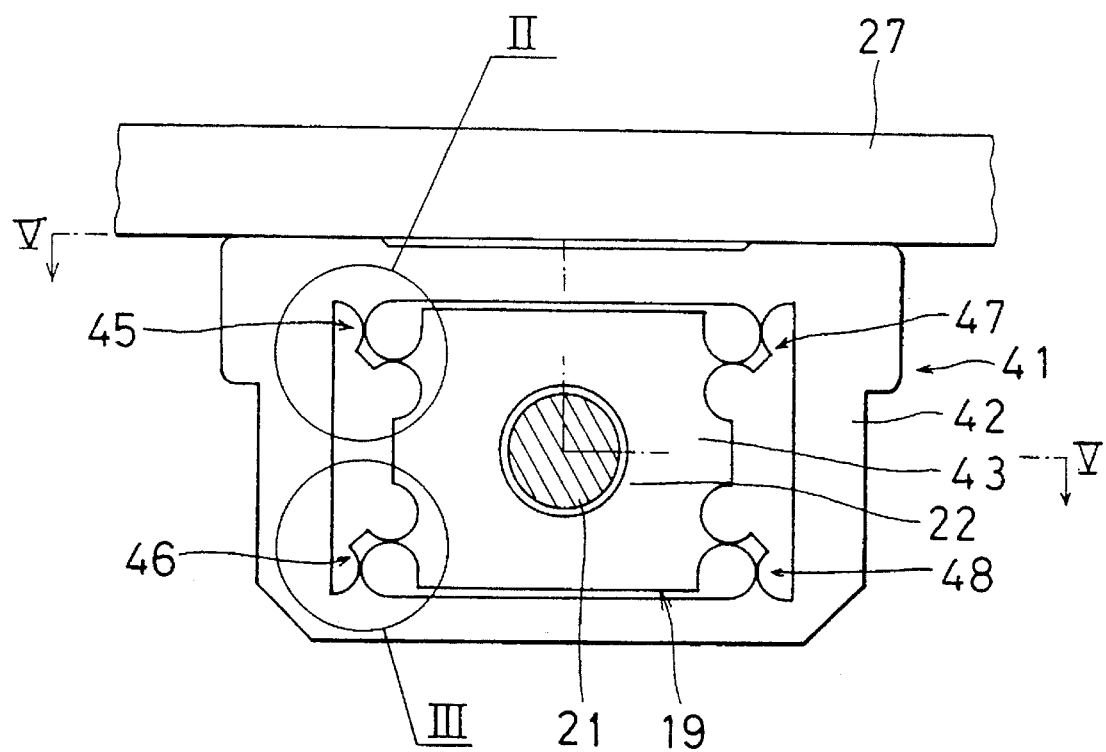
FIG. 4 is a front view containing a partial cross-section of the essential portion of an XY drive apparatus as a first embodiment of the present invention.
Figure 5:
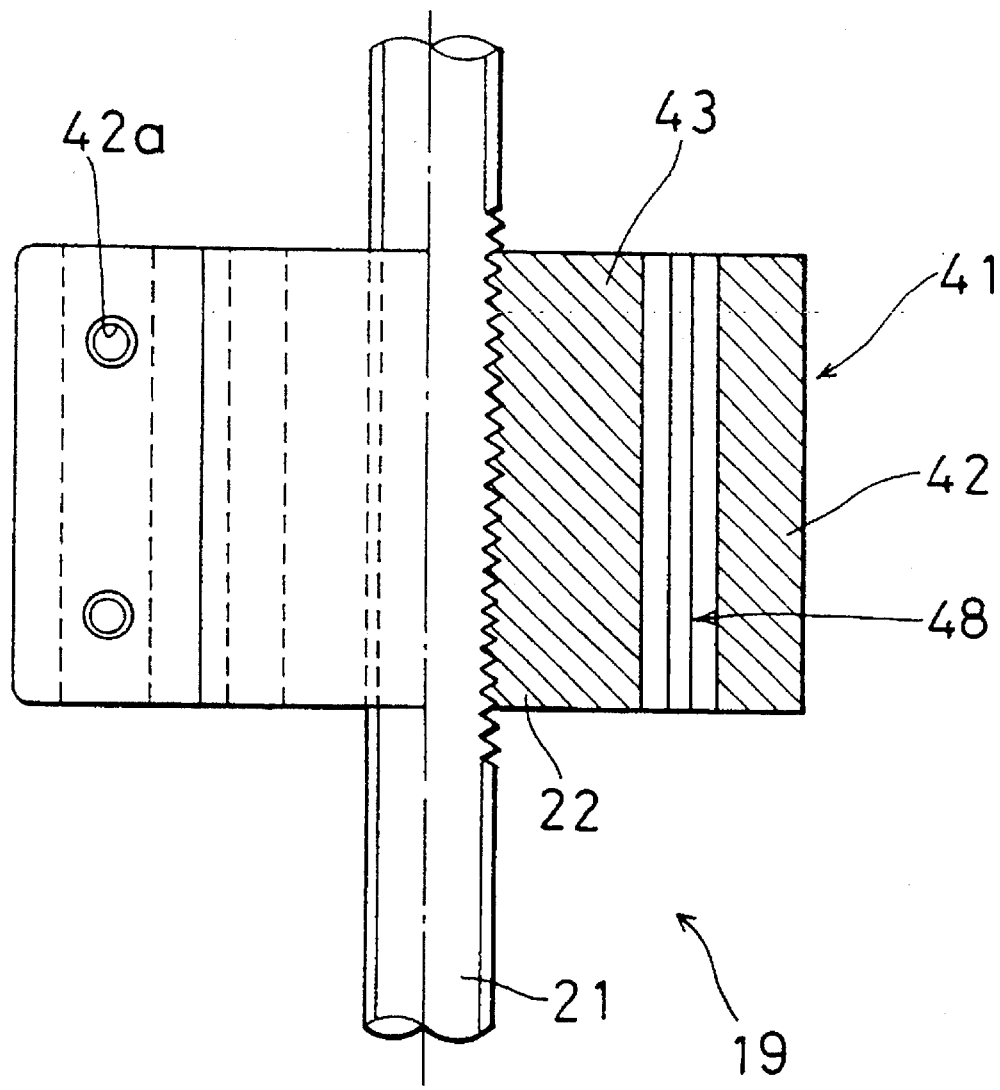
FIG. 5 is a view taken along arrows V—V relating to FIG. 4.

As shown in FIGS. 4 and 5, in the XY drive apparatus, intermediate member 41 is attached to the lower surface of a driven object in the form of moving table 27. This intermediate member 41 is formed by performing ordinary cutting work, wire cutting work and so forth using a block-shaped metal raw material.

As is clear from FIGS. 4 and 5, intermediate member 41 is formed to be laterally symmetrical and in the shape of roughly a hollow rectangle. Intermediate member 41 is composed of base portion 42 mounted to moving table 27, moving portion 43 roughly in the shape of a rectangular solid positioned so as to float within said bases portion 42 and having roughly the same length as said base portion 42, and four flexible portions 45 through 48 formed into a single unit with said base portion 42 and moving portion 43 and flexible in a plane perpendicular to the axial center of screw shaft 21. As described above, intermediate member 41 is made to be compact by employing this constitution wherein moving portion 43 floats within base portion 42.

As is particularly clear from FIG. 5, nut 22 is formed into a single unit with moving portion 43, and the nut 22 screws onto screw shaft 21. As a result of this construction, the nut 22 is able to move within the above-mentioned plane, namely the radial direction. Consequently, even if nut 22 is deflected by rotation of screw shaft 21, only the driving force of the screw shaft 21 which acts in the axial direction is transmitted to moving table 27, while radial deflection as well as pitching, yawing and so forth are removed. Furthermore, as is shown in FIG. 5, screw holes 42a, the number of which is, for example, 4, are formed in base portion 42 of intermediate member 41 into which bolts (not shown) are screwed for fastening the base portion 42 to moving table 27.

As described above, the above-mentioned nut 22 is formed into a single unit with moving portion 43. As a result of employing this constitution, bolts and washers required for fastening the nut 22 and moving portion 43 in the case where the nut 22 is separate from moving portion 43 are unnecessary, thereby reducing the number of parts and making the construction of the apparatus simpler.

Figure 3:
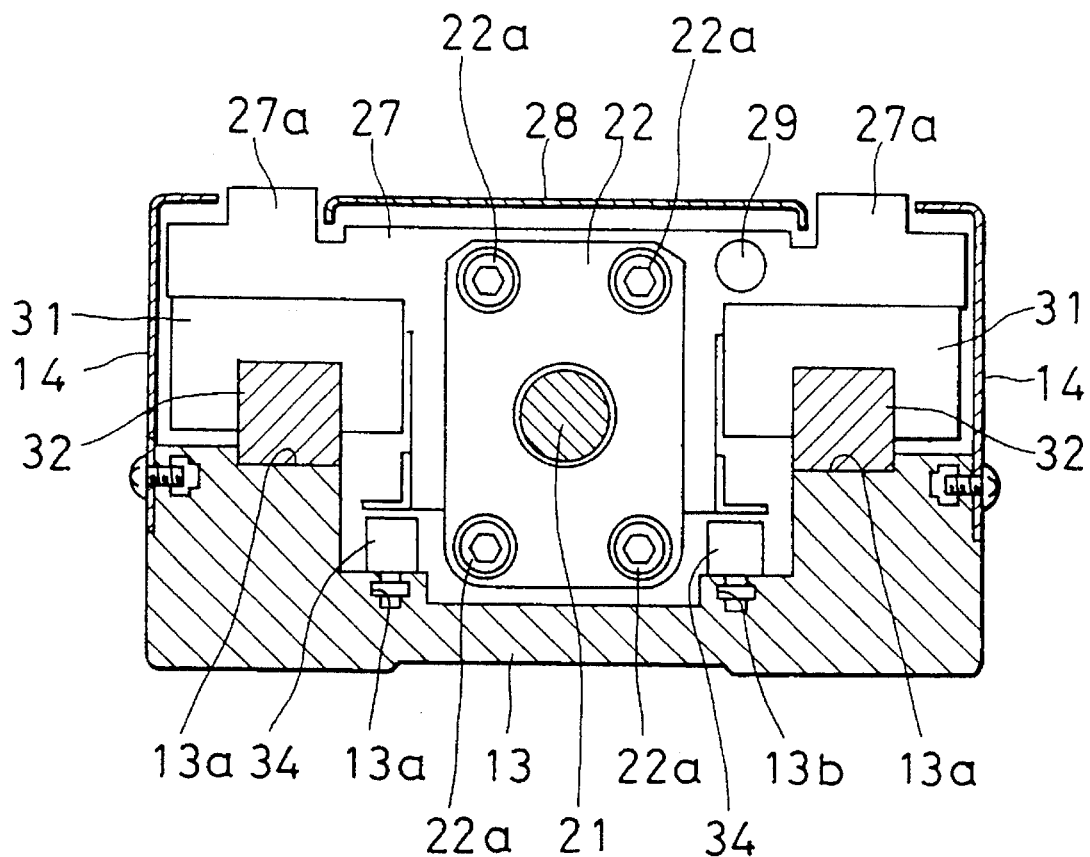
FIG. 3 is a cross-sectional view taken along arrows III—III relating to FIG. 2.

In addition, in the case of employing a constitution involving fastening using bolts and so forth, the lateral surface area of nut 22 to provide interference for pressing the heads of the bolts against the nut 22 must be made correspondingly larger (see FIG. 3). In the apparatus as claimed in the present invention, since the bolts and so forth are not provided as a result of forming nut 22 into a single unit with moving portion 43, nut 22 can be made to be small as shown in the drawings, which, together with not requiring the above-mentioned bolts and so forth, serves to reduce the overall size of the apparatus.

Next, the following provides a detailed description of each of the above-mentioned flexible portions 45 through 48.

As is clear from FIG. 4, each of the flexible portions 45 through 48 is positioned corresponding to the four corners of the above-mentioned base portion 42 and moving portion 43. Furthermore, since intermediate member 41 has a laterally symmetrical shape as previously described, an explanation will only be provided for two of the flexible portions, namely 45 and 46, while an explanation of the other two flexible portions, namely 47 and 48, will be omitted since they have a form similar to the first two. In addition, each of these flexible portions 45 through 48 are formed continuously over roughly the entire length of base portion 42 and moving portion 43 described above.

Figure 6:
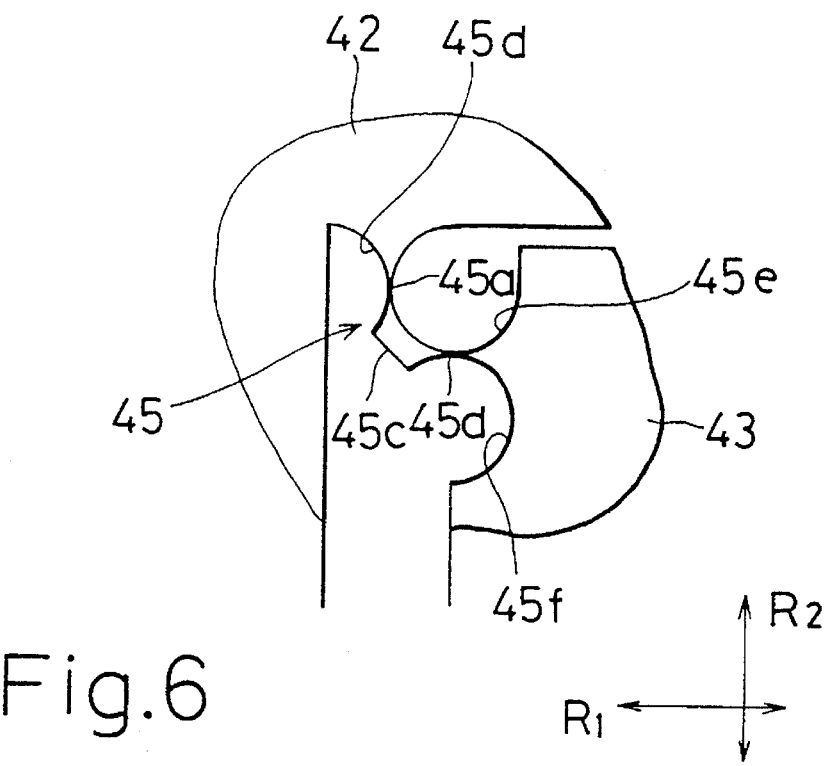
FIG. 6 is an enlarged view of section II in FIG. 4.

As shown in FIG. 6, flexible portion 45 is composed of thin-walled first flexible portion 45a and second flexible portion 45b, respectively coupled into a single unit with base portion 42 and moving portion 43, and junction portion 45c in the form of a small block provided to run between the first and second flexible portions. Furthermore, as is clear from this drawing, the first flexible portion 45a and second flexible portion 45b are obtained by forming circular notches 45d through 45f in a metal block (described above) which is the raw material of intermediate member 41.

The above-mentioned first flexible portion 45a is flexible in a first prescribed direction $R_1$ in a plane perpendicular to the axial center of screw shaft 21, while the other second flexible portion 45b is flexible in a second prescribed direction $R_2$ which is perpendicular to said first prescribed direction $R_1$ in this plane.

On the other hand, flexible portion 46, located below flexible portion 45 described above, is composed in the manner described below.

Figure 7:
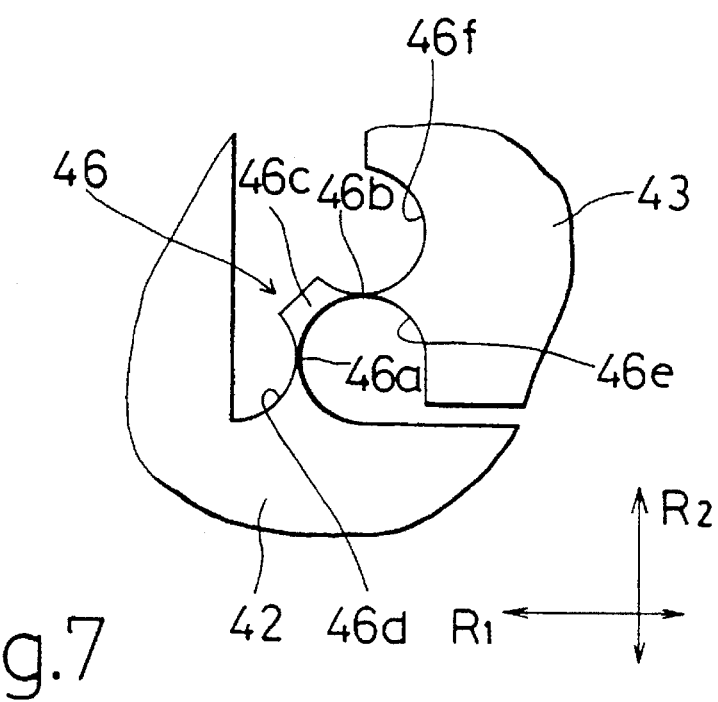
FIG. 7 is an enlarged view of section III in FIG. 4.

As shown in FIG. 7, flexible portion 46 is composed of thin-walled first flexible portion 46a and second flexible portion 46b, respectively coupled into a single unit with base portion 42 and moving portion 43, and junction portion 46c in the form of a small block provided to run between said first and second flexible portions. Furthermore, as is clear from this drawing, the first flexible portion 46a and second flexible portion 46b are obtained by forming circular notches 46d through 46f in a metal block (described above) which is the raw material of intermediate member 41.

The above-mentioned first flexible portion 46a is flexible in the above-mentioned first prescribed direction $R_1$, while the other second flexible portion 46b is flexible in second prescribed direction $R_2$.

In the above-mentioned constitution, when screw shaft 21 is rotated by the torque applied by a motor (16: see FIG. 1), nut 22 moves and moving table 27 is driven through intermediate member 41. At this time, even if nut 22 is deflected in the radial direction by shaft deflection and so forth of screw shaft 21, four flexible portions 45 through 48 flex freely which completely prevents this deflection component from being transmitted to moving table 27. However, the deflection component of nut 22 in a first prescribed direction $R_1$ shown in FIGS. 6 and 7 is absorbed by flexure of first flexible portions 45a and 46a respectively equipped on flexible portions 45 (47) and 46 (48), while the deflection component of nut 22 in a second prescribed direction $R_2$ is absorbed by flexure of second flexible portions 45b and 46b.

On the other hand, since each of the above-mentioned flexible portions 45 through 48 are only able to flex in the radial direction, and are provided with a large amount of rigidity in the feeding direction of nut 22, the flexible portions 45 through 48 are not deformed, thus allowing the feeding of nut 22, namely movement and positioning of moving table 27, to be performed accurately.

Figure 8:
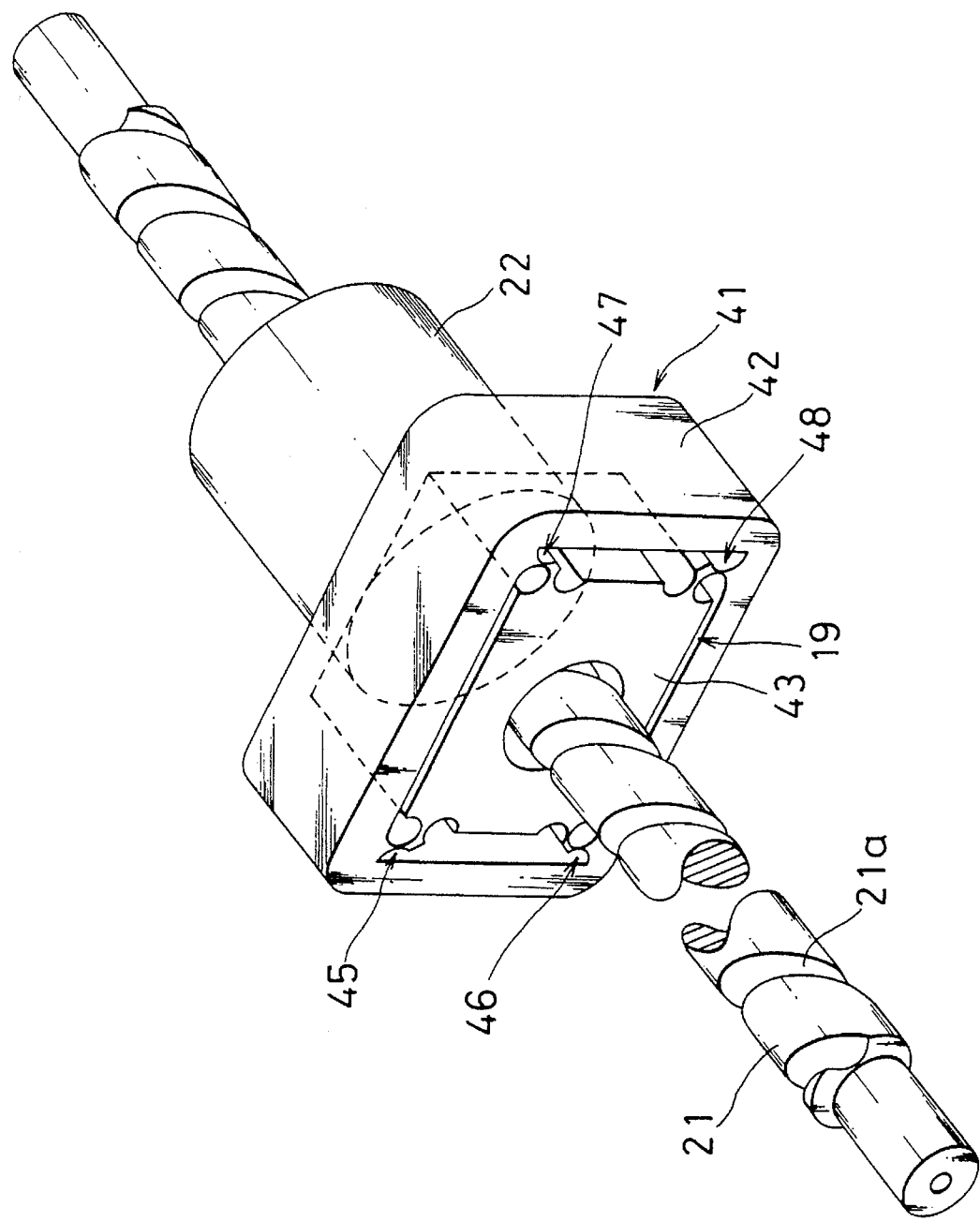
FIG. 8 is a perspective view containing a partial cross-section of the essential portion of an XY drive apparatus as a second embodiment of the present invention.
Figure 9:
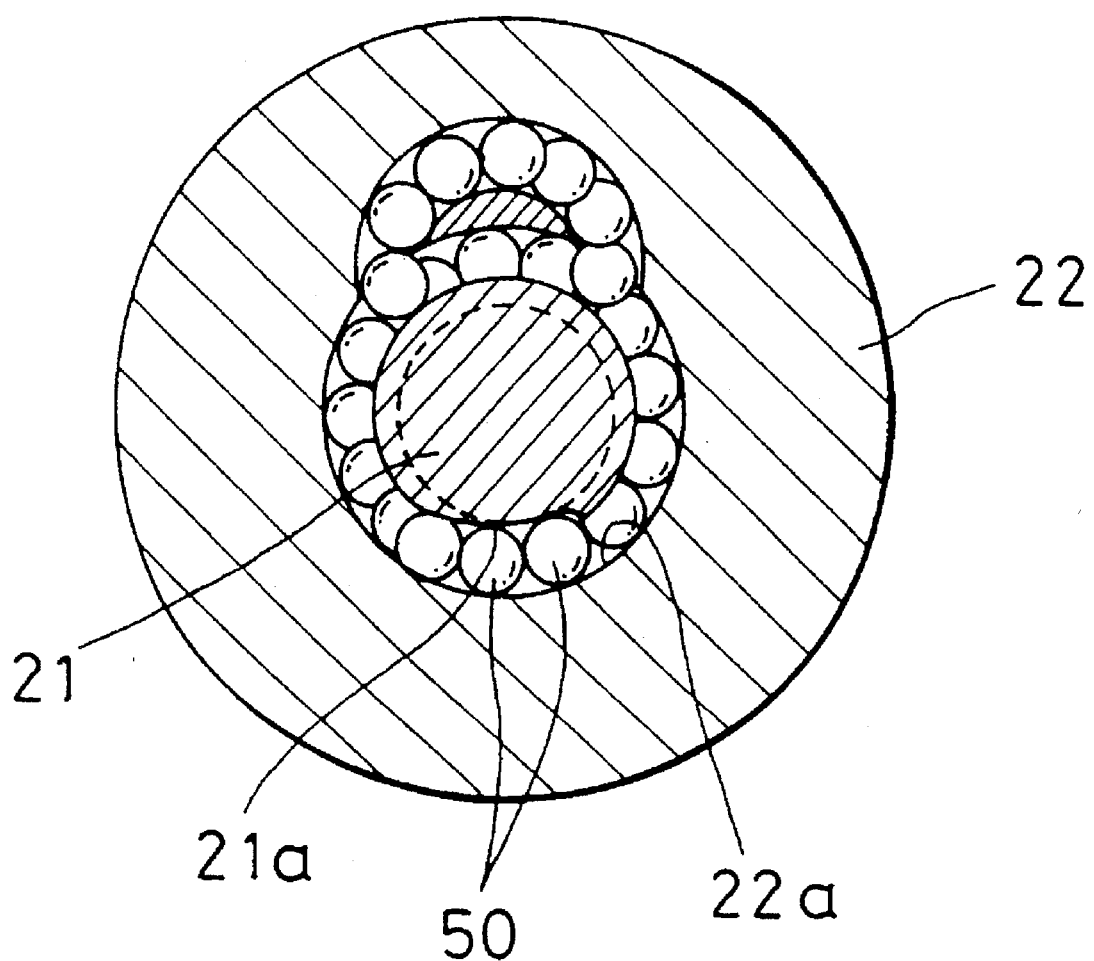
FIG. 9 is a vertical cross-sectional view of the constitution shown in FIG. 8.

FIGS. 8 and 9 show the essential portion of an XY drive apparatus as a second embodiment of the present invention. As shown in the drawings, in the drive apparatus, screw shaft 21 and nut 22 are composed of a ball screw shaft and nut. A Polling element circulating path containing load bearing track groove 22c corresponding to screw groove 21a of screw shaft 21 is formed in a roughly cylindrical nut 22 formed into a single unit with moving portion 43 as shown in FIG. 9, and rolling elements in the form of a large number of balls 50 are arranged and contained within said rolling element circulating path. These balls 50 circulate accompanying rotation of screw shaft 21, and bear the load between screw shaft 21 and nut 22.

Effects are demonstrated in the apparatus of this embodiment which are similar to those of the apparatus described above as the first embodiment of the present invention.

According to the present invention as explained above, since a nut is supported by an intermediate member having flexible portions able to flex in the radial direction perpendicular to the axial center of a screw shaft, radial deflection, pitching, yawing and so forth of a driven object accompanying deflection of the nut are removed, thereby offering the advantage of being able to perform highly accurate driving having excellent straightness and so forth.

In addition, the above-mentioned intermediate member is formed in integrated fashion to be compact in size, thereby offering the advantage of simplifying the overall construction of the drive apparatus.

Moreover, according to the present invention, as a result of a nut being formed into a single unit with a moving portion, bolts and washers required to fasten the nut and the moving portion in the case where the nut is separate from the moving portion are unnecessary, thereby offering the advantage of reducing the number of parts to simplify the structure of the apparatus.

In addition, as a result of employing said construction involving integrated forming, the nut can be made to be small, which together with reducing the number of parts as described above, offers the advantage of achieving reduced size of the overall apparatus.

What is claimed is:

1. A drive apparatus containing:
   a screw shaft having a spiral thread extending along at least portion thereof; and
   a nut which is screwed onto said spiral thread of said screw shaft and is coupled to a driven object to allow said driven object to be moved along a longitudinal axis of said screw shaft when said screw shaft is rotated;
   wherein, an intermediate member is attached to said driven object and supports said nut while allowing said nut to move in a plane roughly perpendicular to the axial center of said screw shaft, said intermediate member being composed of a base portion mounted on a driven object, a moving portion able to move with respect to said base portion, and flexible portions integrated into a single unit with said base portion and said moving portion which are flexible in said plane, said nut is formed into a single unit with said moving portion.

2. The drive apparatus as set forth in claim 1 wherein said base portion is formed to be hollow, and said moving portion floats within said base portion.

3. The drive apparatus as set forth in claim 1 containing a guiding device which guides said driven object in the direction it is to move.

4. The drive apparatus as set forth in claim 1 wherein said screw shaft and nut are composed of a ball screw shaft and nut.

5. An XY drive apparatus having: a pair of tables arranged so as to mutually cross and allowed to move in relative transverse directions with one of said tables supporting the other, each of said tables containing a screw shaft which has a spiral thread formed along at least a portion thereof and a nut which is screwed onto said spiral thread of said screw shaft and is coupled to a driven object to allow said driven object to move along a longitudinal axis of a respective one of said screw shafts in response to rotation of said screw shafts;
   wherein, an intermediate member is attached to said driven object and supports said nut while allowing said nut to move in a plane roughly perpendicular to the axial center of a respective one of said screw shafts, said intermediate member being composed of a base portion mounted on said driven object, a moving portion able to move with respect to said base portion, and flexible portions integrated into a single unit with said base portion and said moving portion which are flexible in said plane, said nut is formed into a single unit with said moving portion.

6. The XY drive apparatus as set forth in claim 5 containing a guiding device which guides said driven object in the direction it is to move.

* * * * *